United States Patent [19]

Servel et al.

[11] Patent Number: 4,603,416
[45] Date of Patent: Jul. 29, 1986

[54] (TIME DIVISION MULTIPLEX) SWITCHING SYSTEM FOR ROUTING TRAINS OF CONSTANT LENGTH DATA PACKETS

[76] Inventors: Michel Servel, Le Rhu en Servel; Alain Thomas, Cosmos, Bâtiment E, both of 22300 Lannion, France

[21] Appl. No.: 560,732

[22] Filed: Dec. 12, 1983

[30] Foreign Application Priority Data

Dec. 29, 1982 [FR] France ............................. 82 22226

[51] Int. Cl.⁴ .................... H04Q 11/04; H04J 3/24
[52] U.S. Cl. ..................................... 370/60; 370/94
[58] Field of Search .......................... 370/94, 60, 58

[56] References Cited

U.S. PATENT DOCUMENTS

| | | | |
|---|---|---|---|
| 4,168,400 | 9/1979 | de Couasnon et al. | 370/94 |
| 4,271,506 | 6/1981 | Broc et al. | 370/60 |
| 4,314,233 | 2/1982 | Clark | 370/60 |
| 4,354,263 | 10/1982 | Bordry et al. | 370/60 |
| 4,375,097 | 2/1983 | Vlug | 370/94 |
| 4,451,827 | 5/1984 | Kahn et al. | 370/60 |
| 4,464,749 | 8/1984 | Vlug | 370/94 |

*Primary Examiner*—Douglas W. Olms
*Assistant Examiner*—Curtis Kuntz

[57] ABSTRACT

The system switches data packets, with headers, from input junctions to output junctions. The series incoming packets are converted into parallel packets. The headers of each incoming packet and the identity of the involved input junction are transferred to the address inputs of a control memory. The control memory supplies a new header which is assigned to the incoming packet, in replacement of the original header, in order to form the parallel outgoing packet with the remaining part of the incoming packet. A buffer memory is cyclically enabled for writing, in order to store the outgoing packets. Each parallel packet read out of the buffer memory is converted into a series packet. Queues store the addresses of a packet in the buffer memory, and are selectively enabled for writing, depending on information from the control memory. Each queue is assigned to an output junction. Responsive to a signal for indicating that one of the output junctions is enabled, the address contained in the corresponding queue is read, in order to find the output packet which is to be transferred to the outgoing junction in the buffer memory.

10 Claims, 16 Drawing Figures

SWITCHING STAGE

MODULE CIRCUIT FOR SWITCHING STAGE

(TIME DIVISION MULTIPLEX) SWITCHING SYSTEM FOR ROUTING TRAINS OF CONSTANT LENGTH DATA PACKETS

The present invention relates to a TDM (Time Division Multiplex) switching system for routing pulse trains of constant length data packets. More particularly, the invention relates to a TDM packet switching system for use in processing various services with various bit rates from a bit or a few bits up to several Mbits.

BACKGROUND

As an example, a multiplex system carrying synchronous packets, each having a fixed length, is described in the copending U.S. patent application Ser. No. 540,790 filed on Oct. 11, 1983 by the Applicants and entitled "Synchronization for a digital train intended for a correct framing of received information". In that system, packets are data blocks with a fixed length of N bytes, for instance with N=16. The first byte of the packet is the header for identifying the packet being transmitted through the multiplex system. The following fifteen bytes carry the proper information. The multiplex medium is itself divided into time intervals having a fixed length which is equal to the one of a packet. A time interval may be either idle when it does contain any packet, or busy when it contains a packet. In the first case, the byte value in the time slot corresponding to the label is zero, while, for any busy time interval, it may usually be one of the remaining 255 combinations.

In PCM circuit multiplex, the time slots are implicitly identified by their positions in each multiplex frame. In a packet multiplex of the above mentioned type, each packet also occupies a constant time interval, but is also identified by an explicit address on the eight bits. A purpose of the invention is to take advantage of that analogy for providing a synchronous packet multiplex switching system.

For guidance, the TDM switches used for switching n-channel multiplex digital telephone lines are described in the technical book "La commutation électronique" (Electronic Switching) by GRINSEC, pages 247–252. In such TDM switches, the switching function makes it possible to route the contents of any time slot of any input multiplex MUXEi to any time slot of any output multiplex MUXSj. In particular, in the through-output controlled TDM switches designed to ensure a broadcasting function, the incoming time slots are stored at a well defined place in a buffer memory. A control memory, which is programmed when the communications are being established, assigns to each outgoing channel the address of the place in the buffer memory wherein the contents of the time slot will have to be transferred to the associated outgoing channel. Outgoing channels are cyclically scanned and control memory is also read cyclically.

A purpose of this invention is to provide a synchronous packet switching system, wherein the packets are considered as time intervals each with an explicit address, so that those functions may be used which exist in the through-output controlled TDM switches. Essentially, the packet switching function is given a new identification to each incoming packet which has been identified by the rank number of the incoming multiplex carrying it and its header. The new identification comprises two attributes of the same type, i.e. a new header and the rank number of the outgoing multiplex which the packet will be applied to. That is to say, the packet (e,i), e being the number of the incoming multiplex and i the header, is changed into a packet (s,j) with s being the number of the outgoing multiplex and j the new header.

In such a switching operation, the packet (e,i) must be processed before being stored in the buffer memory. Indeed, it is submitted to a "header change or header switching" which corresponds to a time slot change in a conventional TDM circuit switching. The processing is controlled by a control memory which has been programmed by the time the packet communication is established. Thus, the header i is replaced by the header j. Then, the packet (e,j) is stored at a known address in the buffer memory, depending on the write time defined by e. That address is stored in a queue associated with the outgoing multiplex s. Since the system is a through-output control system, during the outgoing multiplex scanning cycle, the queue associated with the outgoing multiplex s is scanned in order to get the address of the next packet to be carried by the outgoing multiplex s. As in TDM switches, the packet data are stored in the buffer memory.

More particularly, in the above described system, the whole packet has implicitly been submitted to a series-to-parallel conversion before being written into the buffer memory, as in TDM switches. In TDM switches, each channel is an 8-bit word. The presently available 8-bit series-to-parallel converters are fast enough to be used in those TDM switches. With respect to packet switching, each packet is obviously made of several bytes, for instance sixteen bytes as described in the above mentioned U.S. patent application. Therefore, the time required for parallel converting a whole packet is substantially longer.

Furthermore, in a packet switch, once the bytes have been parallel converted, the incoming packets carried by each multiplex are always transferred into a memory assigned to that multiplex and used as an input queue or FiFo (first in, first out) memory.

In a packet switch, the series-to-parallel converter of the sequence of parallel bytes operates at a time with a single input queue, i.e. a single input multiplex, the set of input queues having to be processed in a complete cycle, the duration of which is the series transmission duration of a packet. But FIFO memories implementing the queues are relatively slow operating components. For the series-to-parallel conversion of a packet, it is necessary to get access sixteen times to the concerned queue, which requires an excessively long time, and which limits the processing capacity of the system. It is the same at the output for the parallel-to-series conversion.

Another purpose of the invention is to overcome that slowness in order to have a packet switching matrix with a performance which is compatible with the flow rates of the videocommunication services.

According to this invention, for avoiding the mentioned waste of time, the series-to-parallel conversion of the input byte queues is replaced by excessive simultanous permutations of bytes for the set of the incoming multiplex, and for other successive simultanous permutations for the set of outgoing multiplex. Because the control logic circuitry, which comprises the control memory alone, can scan only one label per byte slot, the labels of the packets from different ingoing multiplex are chained one after the other before being processed. To this end, a time shift of one byte slot is provided in the input queues, from one queue to the following one. The series-to-parallel converter is replaced by a rotation matrix capable of performing a controllable rotation on groups of N bytes (16 bytes). The rotation order is incremented step by step, for each byte slot. At the output of the rotation matrix, data are in a "parallel-diagonal" form which will be fully explained in the following specification. The data are stored in the parallel-diagonal form in the buffer memory. The parallel-to-series converter is also made of a cyclically controlled rotation matrix which performs the reverse shifts with respect to the input rotation matrix shifts, in the reverse duration.

BRIEF DESCRIPTION OF DRAWINGS

The above mentioned features of the present invention, as well as others, will appear more clearly from the following description of a number of embodiments, the description being made in conjunction with the accompanying drawings, wherein.

DESCRIPTION OF THE PREFERRED EMBODIMENTS

Figure 1:
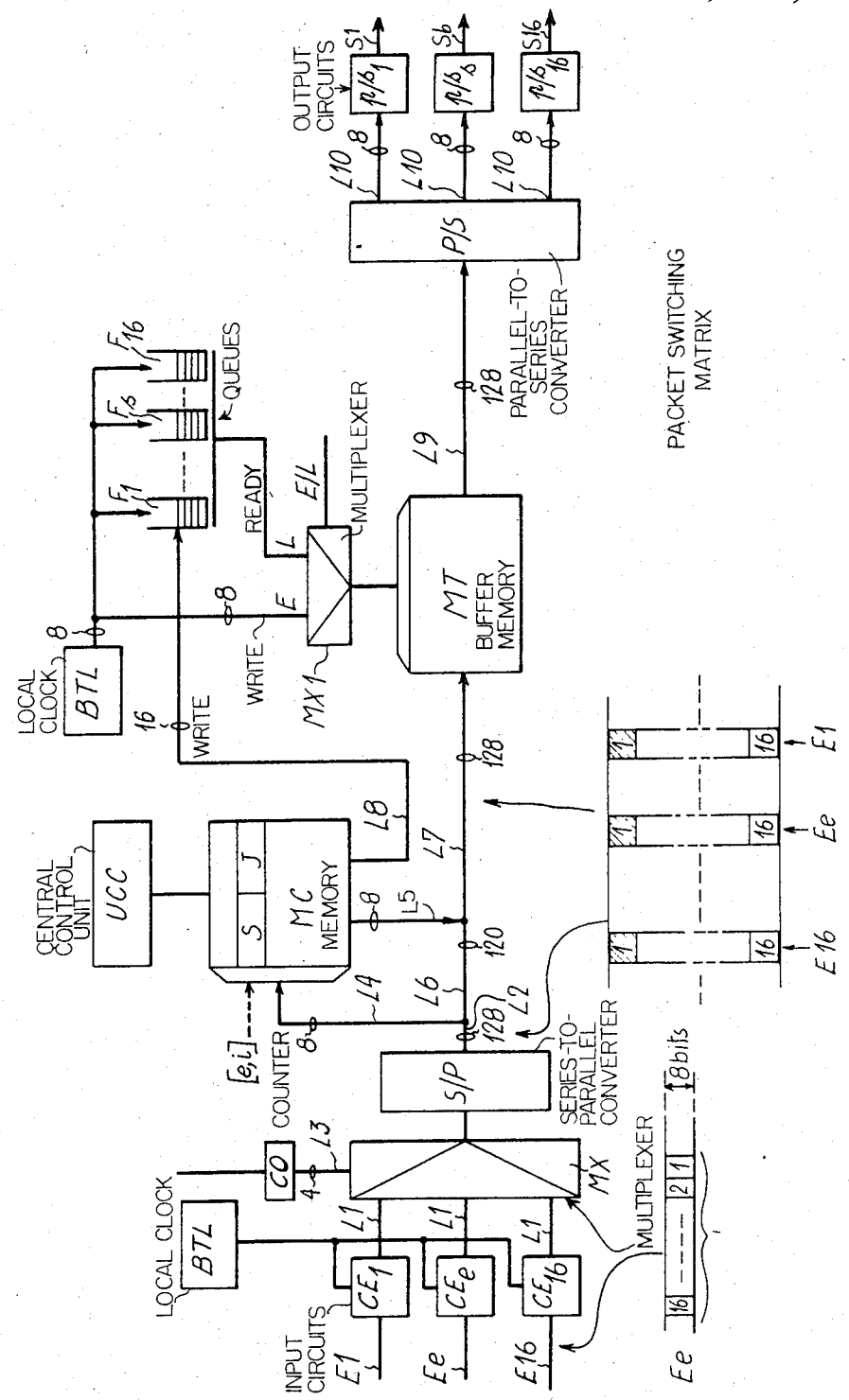
FIG. 1 is the schematic diagram of a packet switching matrix according to this invention.

The block-diagram shown in FIG. 1 shows a first embodiment of a switching matrix that is a major component of the TDM packet switch according to this invention. The data packets appearing on the incoming junctions or multiplex E1–E16 are to be switched in order to be transmitted over junctions or multiplex S1–S16. Each multiplex E1 to E16, which transmits a binary train, is connected to the input of an input circuit CE1 to CE16.

Figure 2:
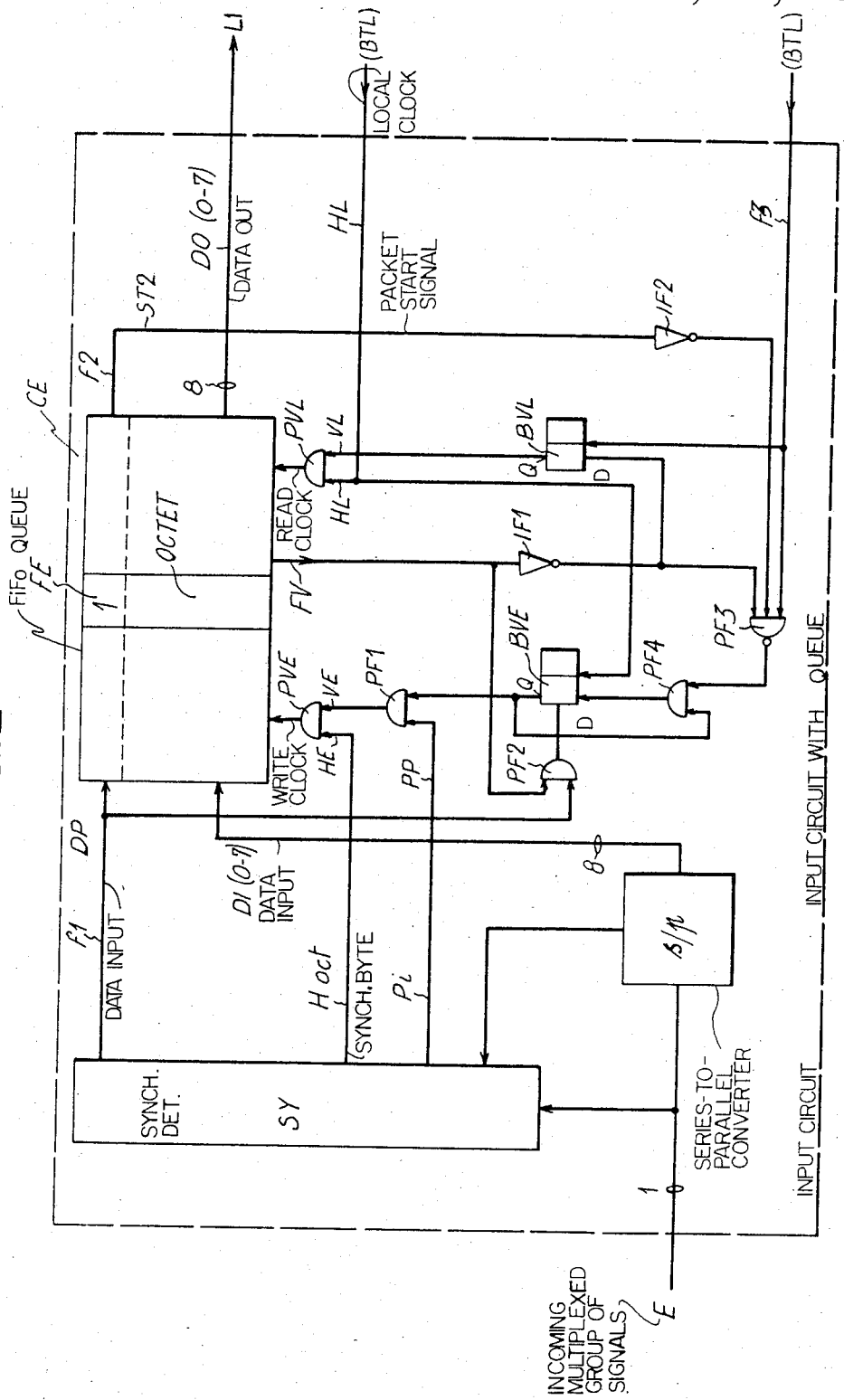
FIG. 2 is the schematic diagram of an input circuit, with an input queue, used in the matrix shown in FIG. 1, FIGS. 3a-3f show waveforms illiuistrating the operation of the circuit shown in FIG. 2.
Figure 3:
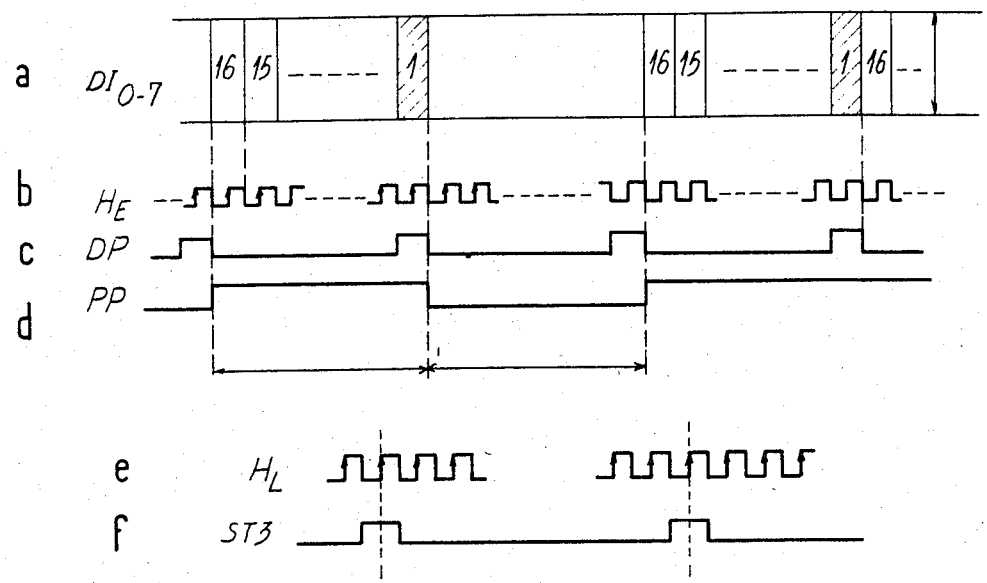

In each input circuit, shown in FIG. 2, the input multiplex E is connected to the input of a series-to-parallel converter s/p which supplies parallel bytes. The output of converter s/p is connected to the input of an input FiFo queue FE, via on 8-wire link D10–D17. The multiplex E is also connected to the input of a synchronization detection circuit SY which analyses the incoming train and first supplies the synchronization byte HE through a wire Hoct, second supplies a "1" signal DP for each first byte of a packet applied to the queue FE, through a wire f1, and third supplies a "1" signal PP each time the processed packed is not idle, through a wire Pi.

The wire f1 is connected to a data input of the queue FE. The queue memory FE is capable to store 9-bit words. Indeed the queues in circuits CE1 to CE16 (FIG. 1) are used for "aligning" the set of incoming multiplex. The size of each queue must be greater than 16 9-bit words. In practice, the circuits CE1 to CE16 are the above mentioned time shifting means for the incoming multiplex E1–E16, the shifting being so that the headers of the outgoing multiplex from circuits CE1–CE16 are supplied simultaneously, or, on the contrary, are sequencially supplied as it will be explained later on.

As shown in FIG. 2, the data inputs to the queue FE are applied over wires D10–D17 to the converter s/p, and over the output wire f1 from the synchronisation detection circuit SY. The write clock input of queue FE is connected from the output of an AND gate PVE having a first input connected from the wire Hoct. The signals transmitted on the wires D10–D17, Hoct, f1 and Pi are depicted in FIGS. 3a to 3d, respectively.

Furthermore, the data outputs of the queue FE are connected to eight wires D00–D07 which transmit the useful data, and a wire f2 which transmits the packet beginning signal ST2 which, at the output, corresponds to DP, at the input. The read clock input is connected from the output of an AND gate PVL having its first input connected from one output HL of a local time base BTL, which is pleziochronous with the clock HE. (Pleziochronous means almost, but not necessarily exactly, synchronized). The second input of the AND gate PVE is a write enabling input VE, and the second input of the AND gate PVL is a read enabling input VL. In addition, the queue FE has an output PV whose output signal, when at "1", indicates that the queue is empty and, when at "0", indicates it is not empty.

The write enabling input VE is connected from the output of an AND gate PF1 which has a first input connected from the wire Pi, and a second input connected from the output Q of a flip-flop BVE of the type D. The set input of flip-flop BVE is connected from the output of an AND gate PF2 which has a first input connected from the wire f1, and a second input connected from the output FV which is at "1" when the queue is empty. The input D of flip-flop BVE is connected from an AND gate PF4 having one input connected from the output of a three-input NAND gate PF3. The other input of gate PF4 is connected from the output Q of the flip-flop BVE. Therefore, the flip-flop BVE can be set to "1" only by the output signal of the gate PF2. The first input of the gate PF3 is connected from the output of an inverter IF1 whose input is connected from the output FV of queue FE. The second input of gate PF3 is connected from the output of an inverter IF2 whose input is connected from the wire f2. The third input of gate PF3 is connected from an output ST3 of the time base BTL, via a wire f3. The clock input of the flip-flop BVE is connected from the clock output HL of BTL.

The signals HL and ST3 are provided by the time base BTL on wires HL and f3 respectively as shown in FIGS. 3e and 3f, respectively. It appears that the signal ST3 on the wire f3 is a local frame synchronizing signal, i.e. a signal delivered each time sixteen pulses H1 have been emitted. In practice, the width of the pulse ST3 is equal to one cycle of signal HL and is forward shifted by a half-cycle with respect to an effective read-out controlled by signal HL. That guard time of a half byte slot allows some negative drift during the reading of the packet. Indeed, the signal ST3 may be produced in the time base BTL by a simple divider by 16 circuit responding to signal HL, the initial time of the divider operation being controlled as will described in the following specification.

The read enable input VL is connected from the output Q of a flip-flop BVL having its input D connected from the output of the inverter IF1 and its clock input is connected from the wire f3.

In normal operation, the flip-flop BVE is at "1", the signals f2 and f3 are synchronous and the queue is not empty. The output of the gate PF3 is at "1", and the output Q of flip-flop BVE is at "1". Since the output of the gate PF1 is at "1", the writing of the packets is enabled in the queue at the rhythm or clock rate of the write clock HE. If the queue FE is not empty, the input D of the flip-flop BVL is at "1". Therefore, the clock input f3 of BVL enables the read out of the queue for the duration of the next frame. In practice, the signal on the wire f1 advances in the queue FE in parallel with the first data octet which has been entered.

In the absence of the signal ST2 on wire f2 at the time the signal ST3 appears on wire f3, and with the queue FE not empty, the output of the gate PF3 turns to "0". The corresponding level is transmitted to the write enable input through the flip-flop BVE. The writing is therefore inhibited. In such a condition, the flip-flop BVE will keep the condition "0" as long as its set input is not activated by the condition "queue empty" ANDed with a packet beginning signal DP on wire f1.

Indeed, while the write operation is inhibited, the read-out operation goes on as long as the queue is not completely empty, i.e. as long as output signal from inverter IF1 is "1". When the queue has been emptied, the read-out operation is interrupted by the next occurrence of the signal ST3.

The queue FE being empty, flip-flop BVE in condition "0" can only be set to "1" when wire f1 is turned to the "1" level at the beginning of the next incoming packet. As soon as flip-flop BVE has turned its condition, write operation may resume unless the next incoming packet is idle, which will be considered in the following specification. In the queue FE, the first written byte of this packet is practically immediately available at the queue output, with a bit "1" applied to wire f2. Since the queue is no longer empty, at the occurrence of a signal ST3, the read-out operation is resumed through flip-flop BVL and PVL, and gate in addition the gate PF3 confirms the normal operation.

When an idle packet is detected in the synchronization detection circuit SY, signal PP is at "0", which inhibits the write operation.

In practice, the synchronization detection circuit SY may be constituted by the circuit shown in FIG. 2 of the above mentioned copending U.S. patent application Ser. No. 540,790, supplemented by a divider-by-eight for providing the signal HE. Indeed, in that circuit, counter CT2 delivers the signal DP and output of comparator COMP may be used for delivering the signal PP. The output Hoct of circuit SY is further connected to the serial-to-parallel converter s/p to ensure a correct conversion of the train of bits into a train of bytes. Alternately, the circuit shown in FIG. 2 of the present invention may comprise logic means for cancelling the contents of the FiFo memory or queue FE as soon as the output of NAND gate PF3 turns to "0". In this case, the link L1 does not carry useless bytes.

In the present embodiment, the multiplex E1–E16 (FIG. 1) are connected from various sources which are not normally synchronized, and, therefore, the packet labels or headers that they are carrying enter the queues of the input circuits CE1–CE6 at various times. As a result therefrom, there is initially no reason for having the headers simultaneously read at the outputs of the queues. The logic circuitry, shown in FIG. 2, enables the alignment of the read out on the external reference ST3 supplied through wire f3. Indeed as hereabove mentioned, the output on wire f3 of the time base BTL determines the read out time of each first packet byte in each queue.

The eight outputs D00–D7 of the circuits CE1 to CE16 (FIG. 1) are respectively connected to the corresponding inputs of a multiplexer MX, via 8-wire links L1. The output of multiplexer MX is connected to the input of a series-to-parallel converter S/P, shown in FIG. 1. The converter S/P delivers each complete incoming packet on an output link L2 having 128 wires. The four output wires L3 of a counter-by-sixteen CO, are connected to the control input of the multiplexer MX. By means of counter CO, the multiplexer MX sequentially scans the outputs of the queues of the input circuits, so that the packets are ordered as shown in FIG. 1, a packet E1 from the junction E1 preceeding a packet E2 from the junction E2, and cyclically so on. In the link L2, the first eight wires carry the header byte and are connected to the address input of a control RAM memory MC, through a link L4. The data output of the control memory MC comprises 24 wires, the first eight wires constituting a 8-wire link L5. The last 120 wires of the link L2 constitute the link L6 which is associated with the link L5 for constituting a 128-wire link L7, which carries the new header j of the packet. The link L7 is connected to the data input of a packet buffer memory MT.

The last sixteen output wires of the control memory MC constitute a link L8 which carries the identity of the output junction or multiplex S through which the concerned packet is to be transmitted. The link L8 is connected to the write control inputs of queues F1–F16, the data inputs of which are connected from the 8-bit output of the time base BTL. The 8-bit output of the time base BTL is also connected to the write input E of a multiplexer MX1 whose output is connected to the address input of the buffer memory MT. The read input L of the multiplexer MX1 is connected to the outputs of the queues F1–F16. At last, the write/read control input E/L of the multiplexer MX1 is connected to an output H of the time base BTL.

The output of the buffer memory MT is connected to the input of a parallel-to-series converter P/S, through a 128-wire link L9. The converter P/S has sixteen groups of outputs respectively connected to the inputs of sixteen parallel-to-series converters p/s, through 8-wire links L10. The outputs of the converters p/s are respectively connected to the output junctions or multiplexers S1–S16. In the converter P/S, the process is reversed with respect to the one performed in the converter S/P, i.e. the 128 parallel input bits are converted into a series of sixteen bytes, the bytes being in parallel and sequentially transmitted through the links L10. In the converters p/s, the bytes are converted into a train of bits.

The switch shown in FIG. 1 operates as follows. In the queues, the read speed is higher than the write speed. Therefore, the read-out is triggered only when the queue contains a sufficient amount of information, i.e. a complete packet. In the converter S/P, the packet from E1, if any, then the packet from E2, if any, and so on, are converted into parallel form. During the time while one packet is being transmitted over the input multiplex, sixteen packets are supplied in succession through link L2. In each transmission cycle on link L2, the packets are identified by their rank e. Through the link L4, the memory MC is addressed by the header i of the packet having the rank e. In response, memory MC delivers the new header through link L5 and the new rank s through link L8, so that the addressee multiplex is determined in the case there is only one addressee.

Meanwhile the rest of the packet is stored in the buffer memory MT via link L7, the storing address of the concerned packet is stored in the queue having the rank s among the queues F1–F16. It will be noticed that the packets transmitted through link L7 have a new header j which has been substituted for original header i. For reading the packets from the buffer memory MT, the outputs of the queues F1–F16 are scanned cyclically, so that those queues transmit in sequence the addresses which are then transmitted through the multiplexer MX1. Therefore, at a given time ts of a cycle, the queue Fs supplies the address of the packet to be read from the buffer memory MT, via the link L9. Since the packet has the rank s in the cycle, the converter P/S transmits it to the output multiplex Ss, through the associated converter p/s.

Accordingly, it appears that a packet having a header i, which has been applied through the multiplex Ee, is outgoing through the multiplex Ss with the header j. Thus, the switching is really performed, and it should be clearly understood that, when the packet communication is established, the central control unit UCC has chosen the substitution pair (s, j) for the pair (e, i) and has stored it in the control memory MC at the address (e, i).

Figure 4:
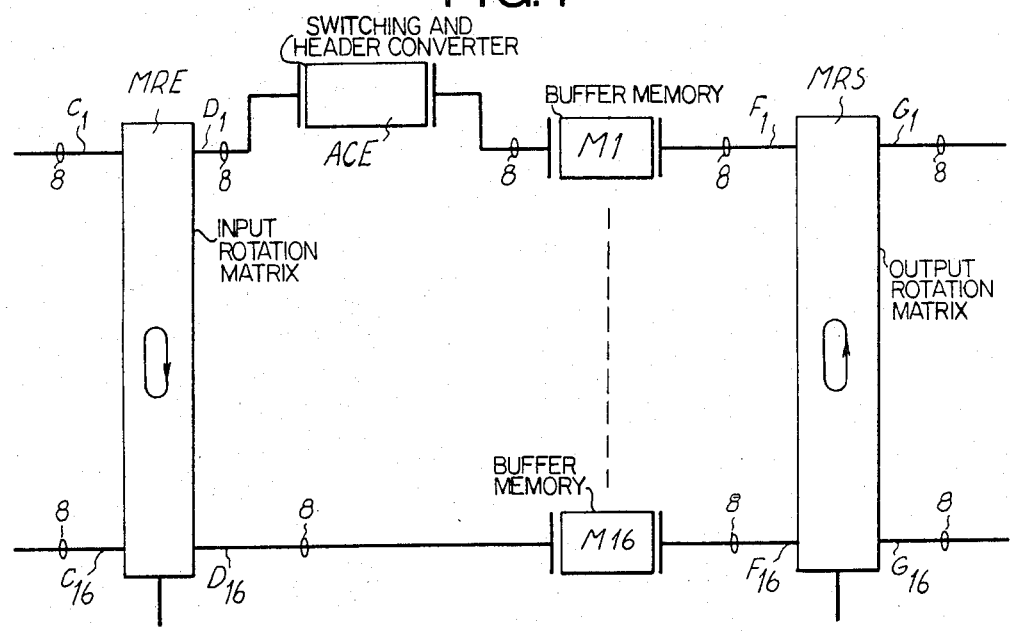
FIG. 4 is a schematic diagram illustrating the operation of another embodiment of the switching matrix according to this invention.

In the schematic diagram of the FIG. 4, the operation of a second embodiment of a switching matrix according to the invention is illustrated in a simple manner.

The switching matrix shown in FIG. 4 comprises an input rotation matrix MRE and an output rotation matrix MRS, instead of the converters S/P and P/S. The input matrix MRE has sixteen 8-wire inputs which are respectively connected from links C1–C16, each of them carrying a packet multiplex wherein the bytes are transmitted in parallel. It will be assumed that the relative time positions of the multiplex carried by links C1–C16 are shown FIG. 5.

Figure 5:
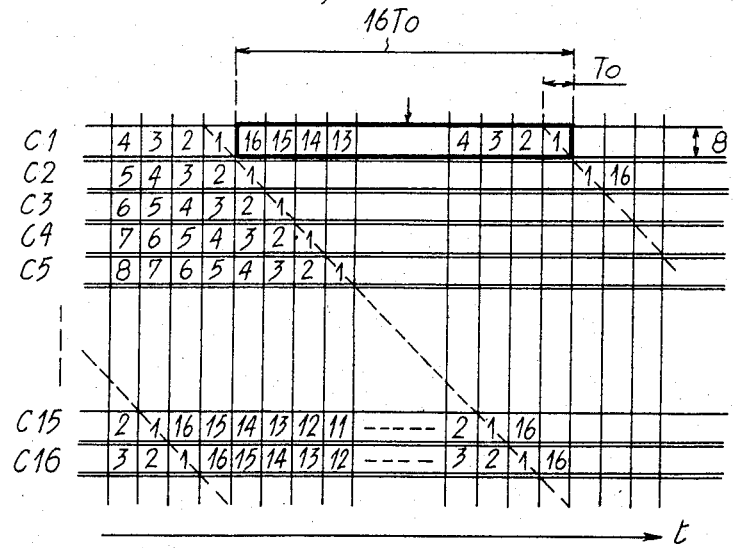
FIG. 5 is a diagram illustrating the relative positions of the input multiplex systems before they enter the input rotation matrix.

In FIG. 5, each packet is shown as being included in a long rectangle in full lines, and the sixteen bytes of every packet are identified by their ranks 1 to 16. The multiplex which are respectively carried by the junctions C1–C16 are designated by the references C1–C16 of in the left-hand column. It appears that the multiplex from C2 is ahead by one byte slot in advance of the multiplex from C1. Likewise, the multiplex from C3 is ahead by one byte slot in advance of the multiplex from C2, and so on. Therefore, the bytes "1" of the packets are shifted ahead by one byte slot, from one row to the next one, i.e., the bytes "1" form an apparent downward and forward oblique or diagonal line with respect to the time axis. In other words, at a given time interval, a byte "1" is present on the line C1, a byte "2" on the line C2, a byte "3" on the line C3, ... a byte "16" on the line C16. At the next time interval, a byte "2" is present on the line C1, a byte "3" on the line C2, ... and a byte "1" on the line C16. Assuming that, at this time interval, the byte "1" of the line C16 is physically shifted to the line C1, the byte "2" of the line C1 to the line C2, the byte "3" of the line C2 to the line C3, ... the byte "16" of the line C15 to the line C16; then, at the next time interval, the byte "1" of the line C15 is physically shifted to the line C1, the byte "2" of the line C16 to the line C2, the byte "3" of the line C1 to the line C3, and so on, with an additional shift for each next time interval. The configuration of the FIG. 6 will be obtained. It is this physical shift which is performed by the input rotation matrix MRE of the FIG. 4.

Figure 6:
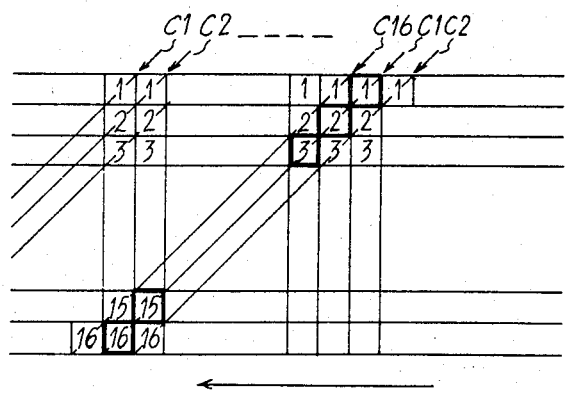
FIG. 6 is a diagram illustrating the positions of the multiplex systems after they have entered the input rotation matrix.

Therefore, the bytes are really arranged as shown in FIG. 6 when they are delivered on the sixteen 8-wire outputs D1–D16 of the matrix MRE. Thus, if, at the time T1, the byte "1" of a packet is delivered on output D1, the byte "2" of the same packet will be delivered on output D2 at the time T2, the byte "3" on output D3 at the time T3, and so on until the byte "16" is delivered on output D16 at the time T16. Each packet looks like it is diagonally arranged on the outputs D1 to D16.

To be noted that the eight wires of the output D1 sequencially deliver all the bytes "1", i.e. the headers of the incoming packets from links C16–C1. As a result, the physical situation is quite similar to the one of the switching matrix shown in FIG. 1 as far as the headers are concerned. Thus, the headers are sequentially delivered from the output D1 and may be processed in a control memory such as MC for replacing them by new headers.

In FIG. 4, the output D1 of the rotation matrix MRE is connected to the input of a switching and header converting circuit ACE, the output of which is connected to the input of a buffer memory M1 through an 8-wire link. Furthermore, the outputs D2–D16 of the matrix MRE are respectively connected to the inputs of the buffer memories M2–M16 through 8-wire links. The memories M1–M16 form a data buffer memory which has the same function as the memory MT in the circuit shown in FIG. 1. However, the time positions of the multiplex delivered from outputs D1–D16, as shown in FIG. 6, are such that, in the data buffer memory formed by buffer memories M1–M16, the packets are arranged according to the configuration shown in FIG. 6.

Obviously, the circuit ACE is provided with a control memory which is able to perform the conversion of the headers.

The outputs of the memories M1–M16 are respectively connected to the corresponding inputs F1–F16 of the output rotation matrix MRS, via 8-wire links. The matrix MRS has sixteen 8-wire outputs G1–G16 which are connected to the output junctions or multiplex of the switching matrix through parallel/series byte converters.

The outputs G1-G16 are cyclically processed for reading out the packets stored in the memory M. Therefore, at the inputs F1-F16, the relative positions of the packets have a configuration similar to the one shown in FIG. 6. Thus, the packets which is to be delivered from output G1 is diagonally arranged with respect to time on the inputs F1-F16. That packet is followed by the packet which is to be delivered from output G2, and so on.

As to the packet to be delivered from output G1, at the time T1, the output rotation matrix MRS transmits directly to output G1 the byte from input F1; at the time T2, the matrix MRS shifts the byte applied to input F2 for transmitting it to output G1; at the time T3, the byte applied to input F3 is shifted and transmitted to output G1, and so on. In the rotation matrix MRS, the bytes are shifted in the opposite direction with respect to the shifting operations in the matrix MRE.

Figure 7:
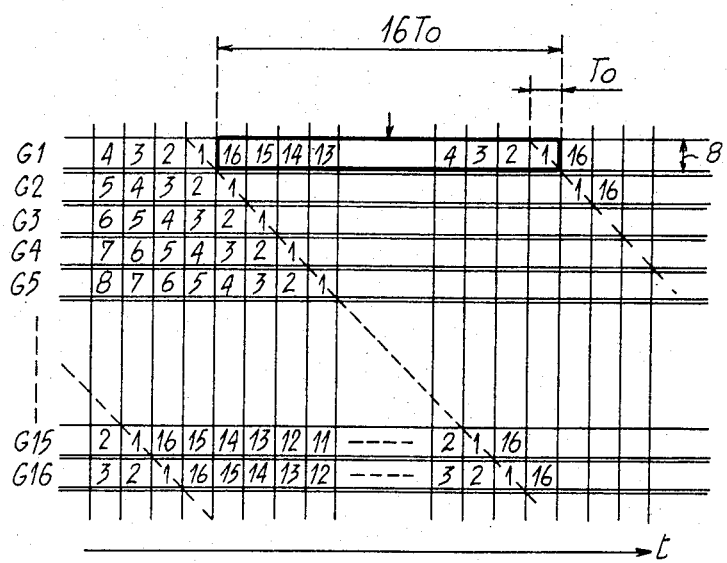
FIG. 7 is a diagram illustrating the positions of the multiplex systems after they have entered the output rotation matrix.

Obviously, at the time T2, the byte applied to the input F1 is shifted and transmitted from the output D16, and so on. Thus, the respective positions at the outputs G1-G16 are similar to the respective positions on the inputs C1-C16, as shown in FIG. 7.

Figure 8:
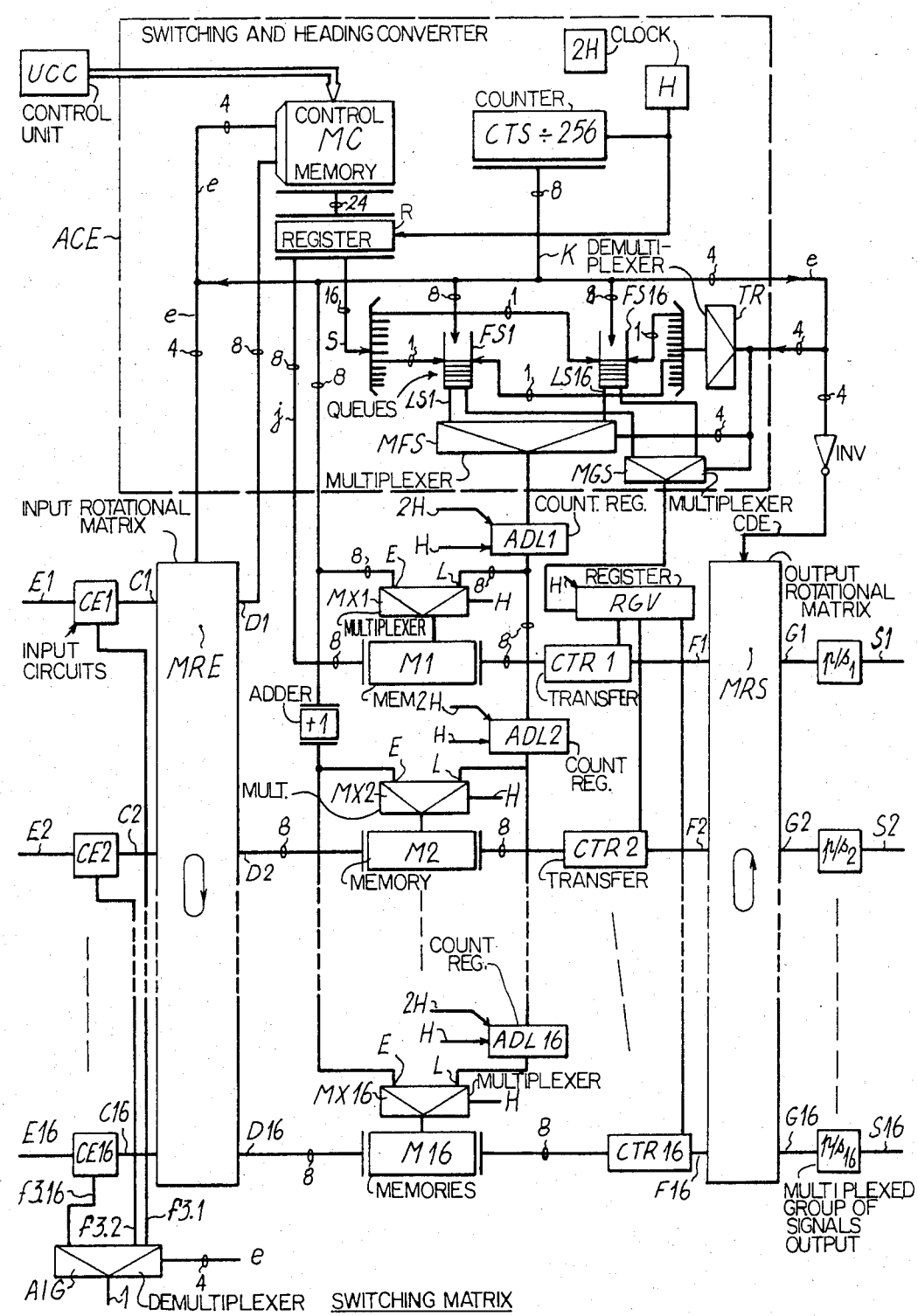
FIG. 8 is a schematic diagram of a switching matrix according to this invention.

FIG. 8 gives a detailed diagram of one embodiment of the circuit broadly shown in FIG. 4. The input junctions or multiplex E1-E16 are connected to the inputs C1-C16 of an input rotation matrix MRE, through input circuits CE1-CE16. The data output D1 of the matrix MRE is connected to the first eight address inputs of a RAM memory MC in the circuit ACE, through an 8-wire link. The outputs D2-D16 are connected to the inputs of memories M2-M16, as shown in FIG. 4.

An 8-stage counter CTS connected from a time base BTL has a 4-wire output e for transmitting the four low weight bits, the output e being connected to the control input of a demultiplexer circuit AIG which has sixteen outputs f3.1-f3.16 respectively connected to the inputs f3 of the input circuits CE1-C216. The cyclic operation of counter CTS results in having a level "1" circulating on the output f3.1-f3.16. The signals sequentially applied to the wires f3.1 f3.1 under control of the counter CTS are thus time shifted so that the first bytes in the input circuits CE1-CE16 are read one after the other. As a result, the outgoing packets have the time positions illustrated in FIG. 5.

Four second address inputs of the memory MC are connected to the link e. The link e is also connected to the control input CDE insuring the shifting operations in the input rotation matrix MRE.

The counter CTS is connected, through a 8-wire link K, first, to the input E of a multiplexer MX1, second, to the data inputs of output address queues FS1-FS16, and, third, to the input of an adder +1 which adds 1 to the address it receives from counter CTS. The output of the adder +1 is connected in parallel to the respective inputs E of multiplexers MX2-MX16, through 8-wire links. It is not necessary to provide the adder, but keeps the oblique configuration of the packets in the memories M1-M16, taking into account the byte period which is used for analysing a header in the circuit ACE.

The output of memory MC is connected to its output register R through 24 wires. The first eight outputs of register R are connected to the input of the buffer memory M1 through a link j, and the last sixteen outputs are separately connected to the write control inputs of the output address queues FS1-FS16. The clock input of register R is connected to the output of clock H in the time base BTL, the output H being synchronized with the read clock HL mentioned in FIG. 2.

The outputs of memories M1-M16 are connected to transfer circuits CTR1-CTR16 whose outputs are respectively connected to the inputs F1-F16 of the output rotation matrix MRS.

Figure 9:
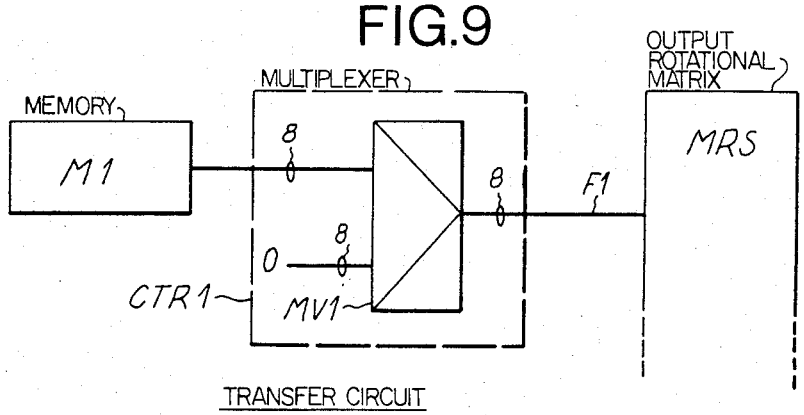
FIGS. 9 and 10 are schematic diagrams of transfer circuits used in the matrix shown in FIG. 8.

In the transfer circuit CTR1, shown in FIG. 9, the output of the memory M1 is connected to the first group of the 8-wire inputs of a multiplexer MV1 having two input groups, the second input group being connected to a potential corresponding to the bit "0". The output of multiplexer MV1 is connected to the input F1 of matrix MRS.

Figure 10:
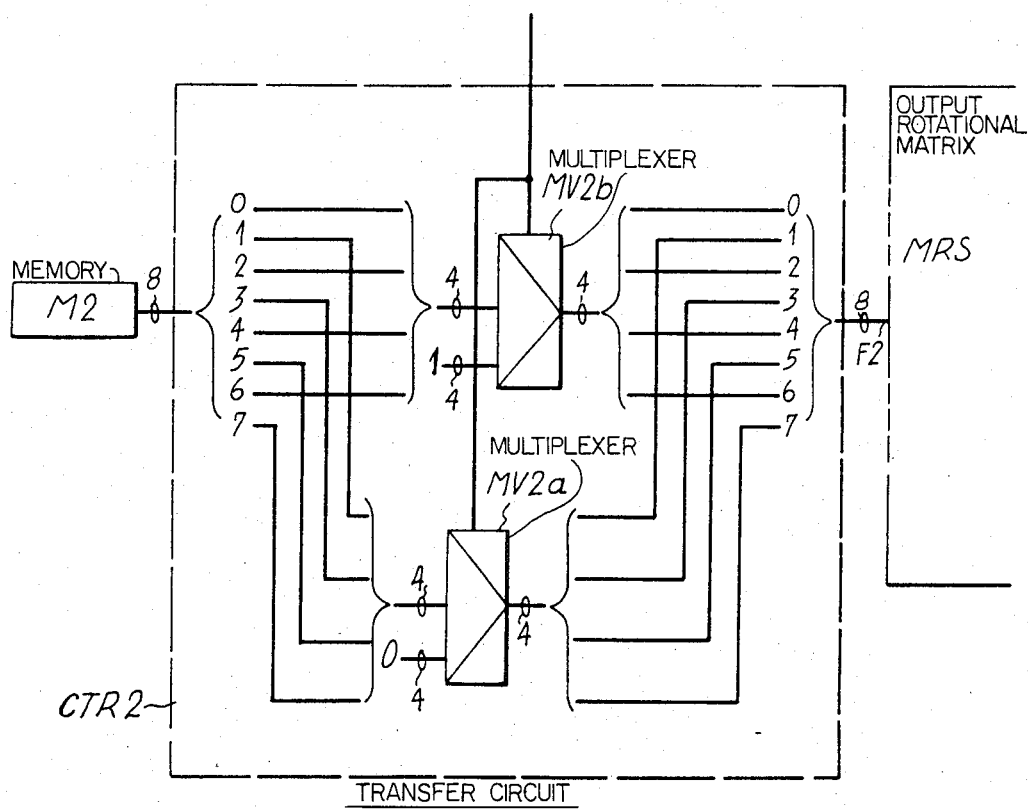

In the transfer circuit CTR2, shown in FIG. 10, the four odd output wires, the wires being numbered 0,1, . . . ,7, from memory M2 are respectively connected to the first inputs of a multiplexer MV2a, while the four even outputs wires are respectively connected to the first inputs of a multiplexer MV2b. The second inputs of the multiplexer MV2a are connected to a potential corresponding to the bit "0", while the second inputs of the multiplexer MV2b are connected to a potential corresponding to the bit "1". The four output wires of the multiplexers MV2a and MV2b respectively form the odd and even output wires of the transfer circuit CTR2, which are connected to the input F2 of the output rotation matrix MRS.

The structure of every transfer circuit CTR3-CTR16 is the same as circuit CTR2 shown in FIG. 10.

The control inputs of the circuits CTR1 to CTR16 are respectively connected from the corresponding outputs of a 16-bit register RGV (FIG. 8). The data input of the register RGV is connected from the output of a multiplexer MGS, and its clock input is connected to the output of clock H of BTL. The sixteen inputs of the multiplexer MGS are connected from the output wire "queue empty" of the queues FS1 to FS16. The control input of multiplexer MGS is connected to the link e.

The outputs G1-G16 of the matrix MRS are respectively connected to the output junctions or multiplex S1-S16.

The shift control input CDS of the matrix MRS receives the data from the link e, after each bit has been reversed in an inverter. The link e is also connected, on one hand, towards a demultiplexer TR, and, on the other hand, towards the control input of a multiplexer MFS. The sixteen separate outputs of the demultiplexer TR are separately connected to the read inputs of the queues FS1-FS16. In the demultiplexer TR, the binary number transmitted through link e is decoded into a read order, formed on the appropriate wire, in order to control the reading of an address in one of the queues FS1-FS16.

The data outputs of queues FS1-FS16 are connected to the corresponding inputs of the multiplexer MFS, through sixteen 8-wire links LS1-LS16. The 8-wire output of the multiplexer MFS is connected to the input of a counter-register ADL1. The 8-wire output of the counter-register ADL1 is connected, on one hand, to the input L of the multiplexer MX1, and, on the other hand, to the input of a counter-register ADL2. The 8-wire output of the counter-register ADL2 is connected on one hand, to the input L of a multiplexer MX2, and, on the other hand, to the input of the next counter-register ADL3, and so on till the counter-register ADL16.

Each counter-register ADL1-ADL16 is connected, on one hand, to the output H of the base time clock BTL through its loading input or count function selection input, and, on the other hand, to another output 2H of BTL through its selected function enabling input. The frequency of signals from output 2H is twice the frequency of signals from output H.

The 8-wire outputs of multiplexers MX1-MX16 are respectively connected to the address inputs of memories M1-M16. The write/read control inputs E/L of multiplexers MX1-MX16 are connected from output H, for selecting either the group associated with the input E, carrying the write addresses, or the group associated with the input L carrying the read addresses.

The operation of the switching circuit shown in FIG. 8 will now be described. The operation of the input circuits CE1-CE16 has been already described with reference to FIGS. 1-3. The input rotation matrix MRE may be one of the circuits called "Rotate Matrix" or "Shift Matrix" available on the market in technology ECL 100K under the No.100158. When shifted, the output D1 transmits the header i to the memory MC which also receives via link e the rank number of the input junction from counter CTS. From the addresses e and i, the memory MC supplies the new header j and the identity s of the appropriate output junction or multiplex Ss. Meanwhile, the counter CTS delivers a number out of $2^8$, which represents the address Adi at which the header j is to be written into memory M1. Also at the same time, the address Adi is stored in the queue FS1-FS16 which is designated by the value s from output of register R of control memory MC. Still, at the same time, the header j is written. The function of the adder +1 has been already described. As a result, the bytes 2-15 of the packet having the new header j will be successively written into the corresponding memories M2-M6, with the oblique configuration of the FIG. 6.

To be noted that memories M1-M16 are provided for $16 \times 16$ packets and are therefore addressed through eight wires.

The sixteen queues FS1-FS16 are cyclically scanned, from the time base BTL, through the link e and the demultiplexer TR. The information carried by the link e is also for selecting the input of the multiplexer MFS which is connected to the queue selected by the demultiplexer TR. The inverters INV, which are mounted between the link e and the input CDE of the output rotation matrix MRS, are provided for ensuring that matrix MRS will operate in the reverse direction with respect to the input matrix MRE.

During the first half byte slot, the address ADi of the packet header is transmitted to the counter-register ADL1, from the output of which, and through multiplexer MX1, the memory M1 is addressed for read-out operation. During the second half of a byte slot, the counter of the register ADL1 is incremented by 1 and the memory M1 is addressed for writing through multiplexer MX1. At the next byte slot, the counter-register ADL1 transmits its contents to the counter-register ADL2, and, from multiplexer MFS, it receives a new address found in the next queue. Thus, at this time, and during the first half byte slot, the memory M2 may be addressed for read-out operations. From the contents of the register ADL2 and through multiplexer MX2, i.e. the second byte of the packet may be read. During the second half byte slot, the counter-register ADL2 is incremented by 1. At the next byte slot, the byte 3 may be read from the contents of ADL3, and so on.

Thus, it appears that the bytes of a packet are read in sequence from the memories M1-M16, at addresses varying from Adi to Ad(i+15). Furthermore, the control information of the output rotation matrix MRS varies at each byte slot. The bytes of a packet are sequencially delivered from the same output Gs. In the associated parallel-to-serial converter p/s, the bytes are converted into a train of bits. The incoming packet with its modified header is available on the desired output junction.

It is be noted that the frequency of signals from output 2H performs two operations in one byte slot.

The control memory MC is a $4K \times 24$ RAM memory programmed from outside, by the control unit UCC. As hereabove stated, it assignes to each packet from an incoming multiplex a new header corresponding to the outgoing multiplex Ss, corresponding to the queue(s) FSi that will be enabled in parallel for writing, depending on the status of the sixteen output wires S from the register R associated with the control memory MC. The address of the first byte of the concerned packet, marked by CTS, is stored in the enabled queue(s) FSi. Thus, it appears that the switching matrix according to the invention, not only can transmit the packets point by point, but also allows them to be broadcasted when several queues FSi are marked.

When the queues FS1-FS16 are empty, their outputs deliver the value 0. It means that no packet is to be sent on the corresponding multiplex, or else, that the transmitted packet must have a null header if, as hereabove mentioned, it is desired to use the synchronization mode described in the above mentioned U.S. patent application. When the output "queue empty" wire of a queue FSi, enabled by the demultiplexer TR, is at "1", indicating that the scanned queue is empty. The signal "1" appears at the output of the multiplexer MGS, so that the first output wire of the register RGV is at "1", connecting the multiplexer MV1 (FIG. 9) of CTR1 to the bit potential "0". Thus, a null byte is supplied by MV1 on the input F1. At the next time of the clock H, the bit "1" of register RGV is on the next wire, and, in transfer CTR2, multiplexer MV2a and multiplexer MV2b are respectively connected to the bit potentials "1" and "0". Therefore, multiplexer MV2a and MV2b (FIG. 10) deliver to the input F2 an byte made of "1" and "0" in alternance. The processus is the same for the next byte slots and the transfer circuit CTR3 (MVSa, MV3b) to CTR16 (MV16a, MV16b). A packet is thus constituted with a null header and a succession of "1" and "0" in alternance.

Figure 11:
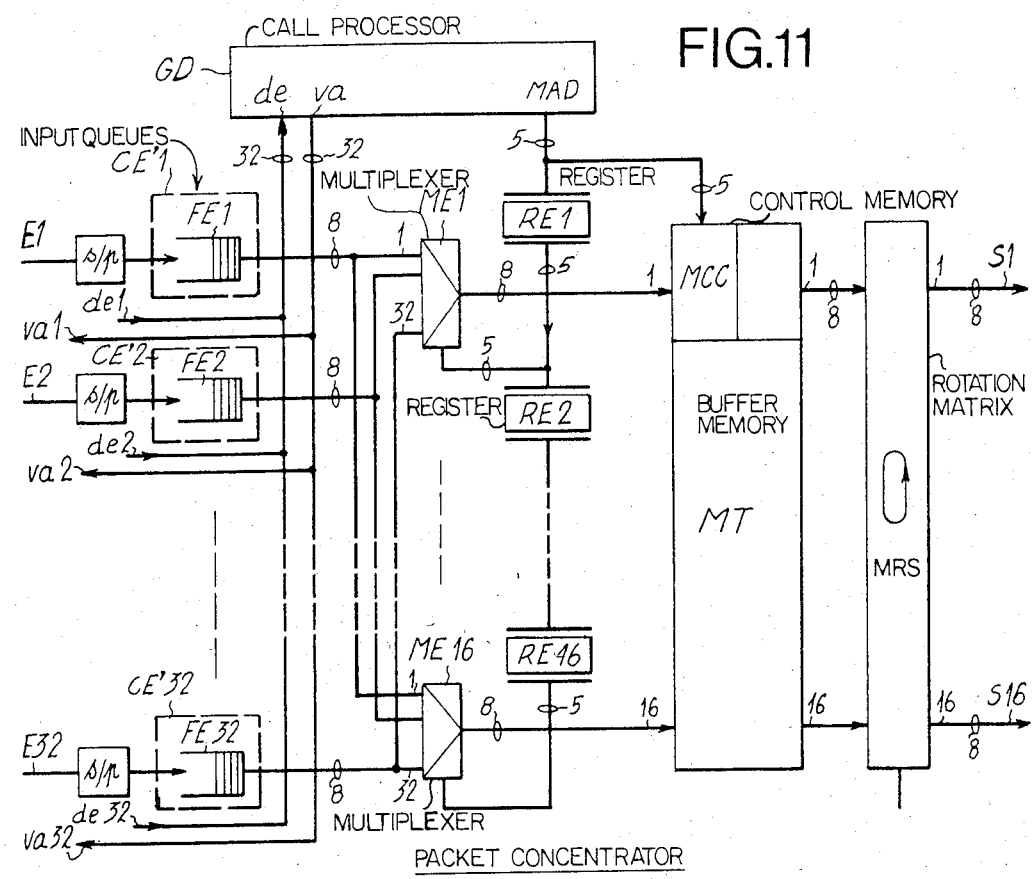
FIG. 11 is the schematic diagram of a concentrator according to this invention.

In FIG. 11, there is shown a packet concentrator which practically operates as the switching circuit shown in FIG. 8.

Before describing in details the concentrator shown in FIG. 11, it will be noticed that a concentrator may be directly realized from the matrix of the FIG. 8, by reducing the number of junctions at the output, i.e. the number of multiplexes. However, it seems better to have a greater number of input junctions while keeping the same number of output junctions. This solution is carried into effect in the concentrator shown in FIG. 11.

The concentrator shown in FIG. 11 has 32 input junctions E1-E32 which are connected to the input circuits CE'1-CE'32 which are similar to the circuits C1-C16 shown in FIG. 1. In each circuit CE'1-CE'32, the FiFo output FV, indicating that the queue is not empty, is connected to a service call wire de which is at "1" when the queue contains an information. Further, the wire f3 is connected to a read control wire va which is enabled for controlling the reading in the queue. The 32 wires de and the 32 wires va are connected to a call processing circuit GD, of which an embodiment is shown in details in FIG. 12.

Figure 12:
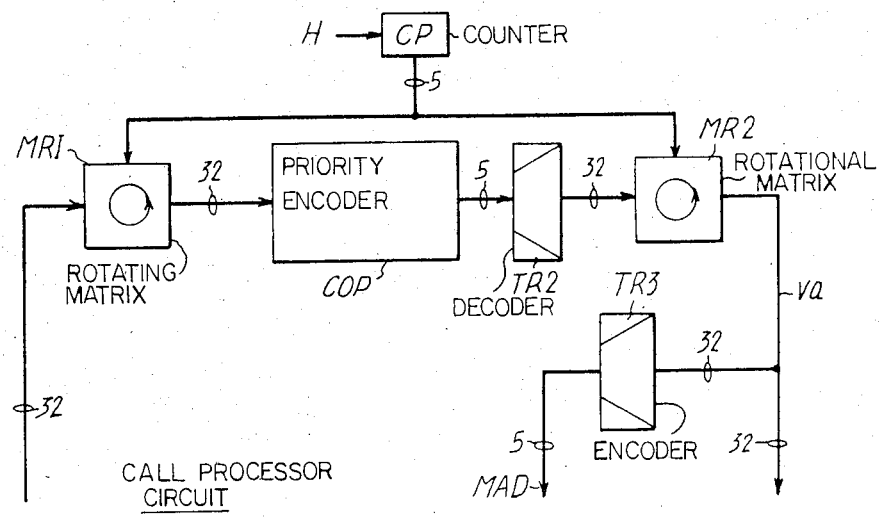
FIG. 12 is a schematic diagram of a management circuit for processing the calls of the concentrator shown in FIG. 11.

In FIG. 12, the 32 wires de are respectively connected to the corresponding inputs of a rotation matrix MR1 whose control input is connected, through a 5-wire link, from a counter CP which is controlled by the clock output H of the time base BTL, the 32-wire output of the matrix MR1 being connected to the input of a priority encoder COP. The 5-wire output of the encoder COP is connected to the input of a decoder TR2 which has 32 output wires connected to the inputs of a rotation matrix MR2, the control input of the latter being also connected from the counter CP, and its 32 output wires constituting the wires va. An encoder TR3 is also connected to the wires va for converting the information present on one of said wire into a 5-bit word supplied to the output MAD.

In FIG. 11, the output MAD is connected, on one hand, to the input of a register RE1, and, on the other hand, to the corresponding input of a control memory MCC. The output of the register RE1 is connected, on one hand, to the control input of a multiplexer ME1, and, on the other hand, to the input of a register RE2. The output of the register RE2 is connected, on one hand, to the control input of a multiplexer ME2 (not shown), and, on the other hand, to the input of a register RE3 (not shown), and so on, until a register RE16 associated with a multiplexer ME16.

Each multiplexer ME1-ME16 has 32 8-wire inputs which are respectively connected from the outputs of the 32 input queues FE1-FE32. The outputs of the multiplexers ME1-ME16 are equivalent to the outputs D1-D16 shown in FIG. 8, and are connected to the control memory MCC and the buffer memory MT respectively. The sixteen 8-wire outputs of the buffer memory MT are connected to the corresponding inputs of an output rotation matrix MRS.

The concentrator shown in FIGS. 11 and 12 operates as follows. The wires de of the input circuits CE'1 to CE'32 are enabled when the associated queues contain an information. In the rotation matrix MR1 (FIG. 12), the calls applied to the inputs are shifted under control of the cyclic counter CP. In the priority encoder COP, which may be realized with the commercially available circuits BCL100K 100165, the marked input which has the highest priority is selected, and the code of that input is delivereded from the output of the encoder. Thus, the output wire of the decoder TR2 which corresponds to the code delivered from COP is enabled. In the rotation matrix MR2 which is controlled in synchronism with the matrix MR1, the order of the enabled input is shifted in the opposite direction, so that, through the wire va, the queue which is controlled is the one which has been chosen by the priority encoder circuit COP. In short, one of 32 wires is chosen with a rotating priority.

Furthermore, the encoder TR3 delivers a 5-bit code word corresponding to the enabled output wire of MR2. The output word of encoder TR3 is transmitted to the register RE1, and, in the multiplexer ME1, the input corresponding to the queue FEi (the letter "i" means any of the queues FE1-FE32) of the circuit CE'1 chosen by COP is selected by the output of register RE1. Thus, the header of the first packet contained in the concerned queue FEi is transmitted to the control memory MCC through multiplexer ME1. In the memory MCC, the header is modified, as hereabove described with reference to the FIG. 8.

As the next byte slot, the content of register RE1 is loaded into the register RE2. The register RE1 being also loaded again. Thus, at this byte slot, the input of the multiplexer ME2 which corresponds to the queue FEi is selected by the contents of register RE2. The concerned queue transmits its second byte which is transmitted to the memory M2 of buffer memory MT. This processus is repeated until the multiplexer ME16.

At this time, at shifted addresses, the buffer memory MT contains the packet of which the configuration in memory MT is the one shown in FIG. 6. At the output, the rotation matrix MRS restores the normal structure, i.e. the packet is transmitted to a single output junction, as it has been described with reference to the circuit shown in FIG. 8.

From the above, and except for the time shifts and the permutations, it appears that the concentrator of the FIG. 11 is very similar to a switching matrix. The control memory MCC is addressed from the packet header and the 5-bit word supplied by the encoder TR3, this word defining the geographical address of the incoming multiplex. At the output, the addressing is made as in the matrix of the FIG. 8.

Switching matrixes with unblocked capacity 16×16 may be grouped for obtaining unblocked structures of greater size. It is also possible to realize switching system structures of the "extended T" type, as in TDM circuit switching.

Figure 13:
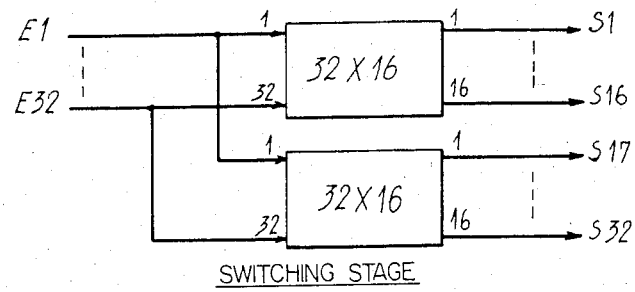
FIG. 13 is a block diagram of a switching stage based on the principle of the switching matrix according to this invention.
Figure 14:
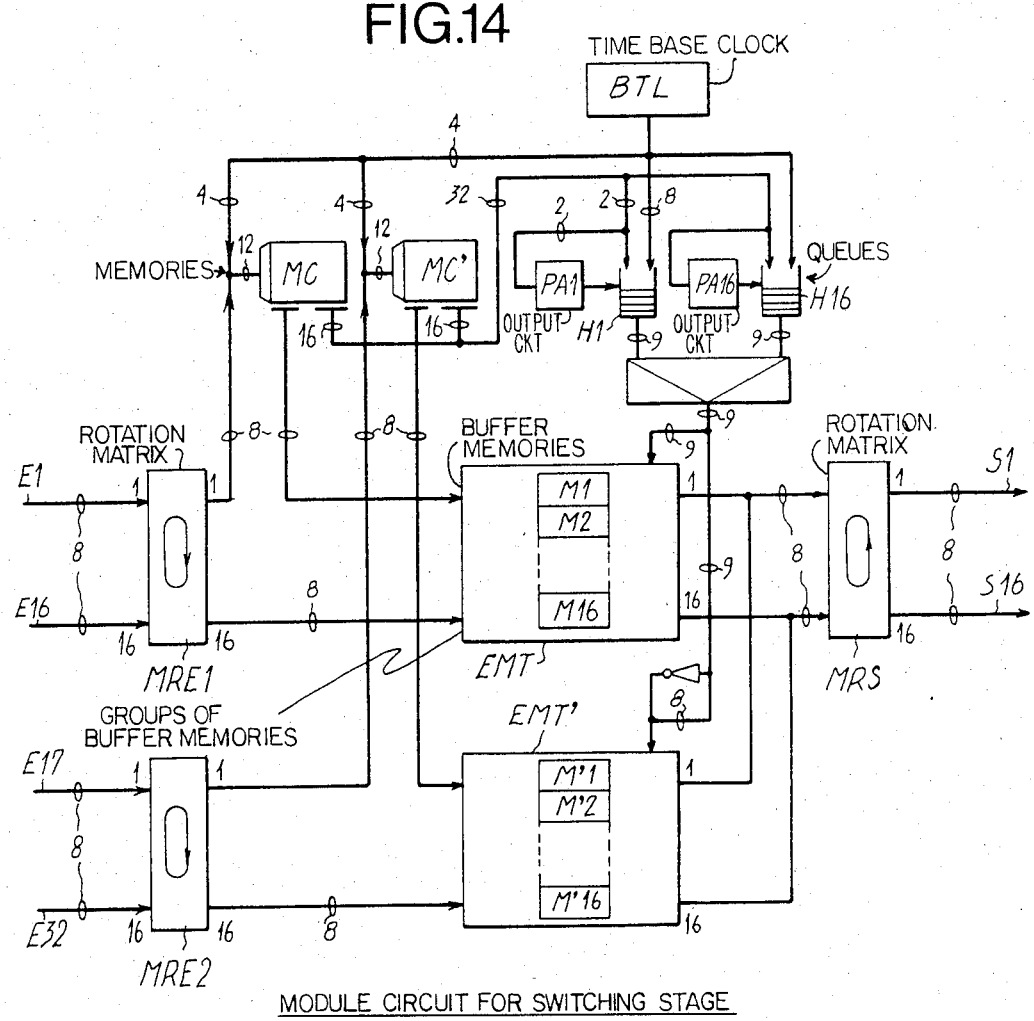
FIG. 14 is a schematic diagram of a circuit of the switching stage shown in FIG. 13.

The block-diagram shown in FIG. 13 shows how a matrix 32×32 may be realized, according to this invention, from two parallel identical modules having a capacity 32×16. The structure of the modules 32×16 is shown in FIG. 14.

The switching stage of the module comprises two input groups E1 to E16 and E17 to E32. The inputs E1–E16 are connected to the inputs of an input rotation matrix MRE1, through byte converters s/p and input circuits (not shown). The inputs E17–E32 are likewise connected to the inputs of an input rotation matrix MRE2. The matrixes MRE1 to MRE2 operate as the matrix MRE shown in FIG. 8.

The outputs D1 and D'1 of the matrixes MRE1 and MRE2 are respectively connected to the corresponding inputs of two memories MC and MC', through 8-wire links. The other four addressing inputs of those memories MC and MC' are connected in parallel to the output of a time base clock BTL. The first eight data outputs of the memories MC and MC' are respectively connected to the inputs of the buffer memories M1 and M'1, each of them being a part of one of two groups of buffer memories EMT and EMT'. As the memory MT shown in FIG. 8, the memory EMT comprises sixteen buffer memories M1-M16, and the memory EM1' comprise sixteen buffer memories M'1-M'16.

The outputs D2-D16 of rotation matrix MRE1 are respectively connected to the data inputs of the memory M2-M16, and the outputs D'2-D'16 of MREZ are respectively connected to the data inputs of the buffer memories M'2-M'16. The outputs of the buffer memories M1 and M'1 are connected to the input F1 of an output rotation matrix MRS, through a wired OR gate; the outputs of the buffer memories Mi and M'i are likewise connected to the input F1 of the matrix matrix MRS. The outputs G1–G16 of MRS are connected to the outputs of the stage, through converters (not shown).

The memories EMT and EMT' are read from the queues H1 to H16 which are similar to the queues FS1 to FS16 of the circuit shown in FIG. 8. The write control inputs of the queues H1–H16 are respectively connected to the outputs of the circuits PA1–PA16. Each circuit PA1 to PA16 has two inputs which are respectively connected from the output wires having the same rank in the last sixteen outputs of each memory MC and MC'.

Figure 15:
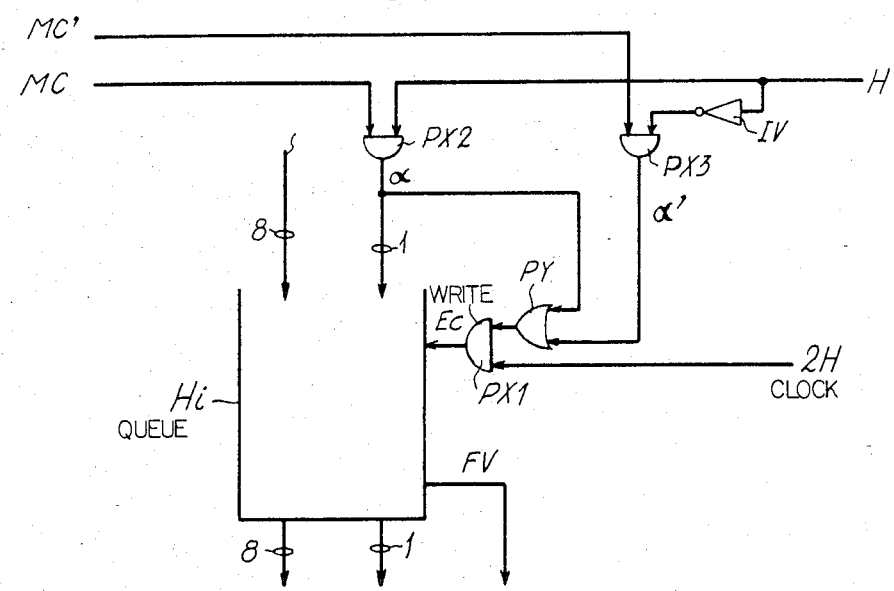
FIG. 15 is a detailed diagram of a part of the circuit shown in FIG. 14.

The FIG. 15 is the detailed scheme of a circuit PAi associated with a queue Hi. The write input EC of each queue Hi is connected to the output of an AND gate PX1, having a first input connected from the clock output 2H of the time base BTL and a second input connected from the output of an OR gate PY. The two inputs of the OR gate PY are respectively connected from the outputs of two AND gates PX2 and PX3. One input of the AND gate PX2 is connected from the $1^{th}$ output wire of the memory MC, the other input being connected from the clock output H of the time base BTL. One input of the AND gate PX3 is connected from the $1^{th}$ output wire of the memory MC', the other input being connected from the clock output H of the time base, through an inverter IV.

The system shown in FIGS. 14 and 15 operates as it follows. Either the group comprising rotation memory MRE1, memory MC, buffer memories EMT, or the group comprising rotation memory MRE2, memory MC', buffer memories EMT', operates as the group MRE, MC, MT as FIG. 8 operates. However, the read system of the buffer memories is different. A packet addressed to a given output may simultaneously come from two incoming multiplexes respectively coming from two input blocks. Therefore, it is necessary to have the possibility of making two address writings in the involved queue(s) H1. Such a result is obtained with the circuit shown in FIG. 15.

Figure 16:
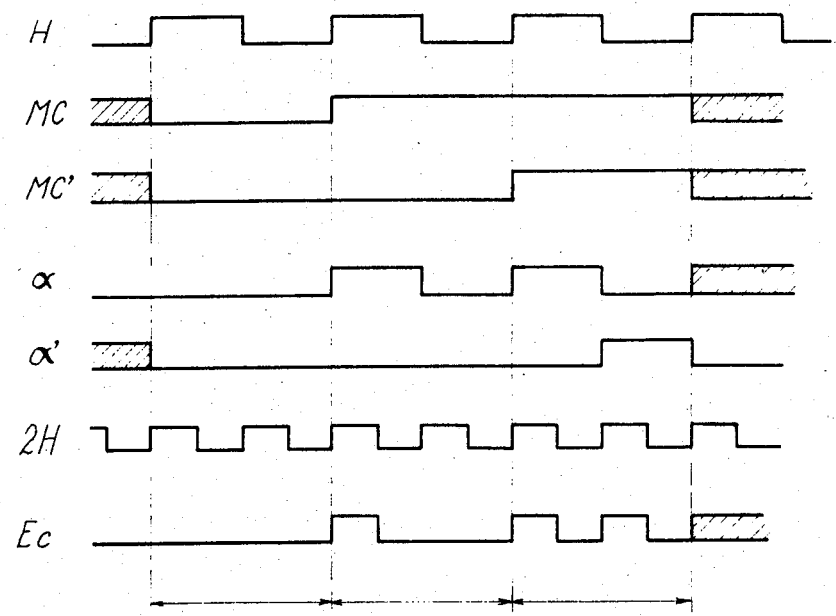
FIG. 16 is a time diagram relative to the operation of the part of circuit shown in FIG. 15.

In a clock cycle H (FIG. 16), one half of the time is assigned to the scanning of the write calls issuing from the memory MC, the other half being assigned to the write calls of the memory MC'. The two significations signals are successively conveyed to the corresponding input of the gate PX1 which samples them at the double rate of the clock 2H. Then, the writing operation may take place with the sampled signals. In the case illustrated by the signal Ec of the FIG. 16, there are (1) no writing operation for a first cycle of the clock H, (2) one writing operation for the next cycle, and (3) two writing operations for the last cycle.

Furthermore, the signal delivered from the gate PX2 is loaded into the queue Hi as a 9th bit indicating either the buffer memory EMT or EMT' in which will be the packet of which the address is loaded in Hi. The 9th bit will be used for enabling the output of one of the two buffer memories.

In the above description, the packets have n=16 bytes corresponding to the number of incoming or outgoing multiplexes, but it will be understood that the system according to the invention generally allows the processing of a multiple integer of k of n bytes. In this case, in the circuits of the FIGS. 1 and 6, the header substitution and the switching control are cyclically performed only once in k times.

What is claimed is:

1. A switching system for switching a plurality of multiplexed groups of signals each of which comprise time intervals containing fixed length data packets, the multiplexed group of signals being incoming from a plurality of input junctions which are being switched toward a plurality of output junctions, each incoming or outgoing packet having a header and a series packet having a train of bits, the switching system comprising:
    first conversion means coupled to an input junction for receiving and converting the train of bits of the packets from a plurality of incoming multiplexed groups of signals into parallel packets;
    programmable control memory means for transmitting the header and the identity of the input junction carrying an incoming packet, means responsive to the data output of said control memory means for delivering a translated header assigned to the parallel incoming packet in replacement of its original header, said translated header forming an outgoing parallel packet with the remaining part of the incoming packet;
    buffer memory means which is cyclically enabled for a write operation for storing the outgoing parallel packets;
    second conversion means responsive to a read out of the buffer memory means for converting each outgoing parallel packet into a series packet which is assigned to an address multiplexed group of signals;
    a plurality of queue means for storing the addresses of the outgoing parallel packets which are stored in the buffer memory, said queue means being selectively enabled for write operations in response to information which is delivered from other data outputs of the control memory, each of said storing queue means being assigned to one of the output junctions; and
    means responsive to a signal indicating that an output junction is enabled for reading the address stored in the corresponding queue means, in order to find the outgoing packet for said junction in the buffer memory.

2. The system according to claim 1, wherein the first conversion means comprise processing means for converting each incoming series packet into an incoming diagonal packet having bytes which are respectively delivered from n outputs in an original time order, the header of any packet being delivered from the first output.

3. The system according to claim 2, wherein the buffer memory means comprises n individual memories, a chain of n serial mounted counter-registers, the queue means having the data outputs which are selectively coupled to give access to the inputs of said chain of counter-registers, the n counter-registers being individually associated with the n memories which supply read addresses for said memories, the counter-registers moving and incrementing address information within the chain to read the information which is converted into a diagonal packet.

4. The system according to claim 2 wherein the conversion means comprise shifting means for timely shifting of an incoming multiplexed group of signals so that the headers of the various multiplexed groups of signals do not occur simultaneously, said headers being delivered in sequence to the first input.

5. The system according to claim 2 wherein the processing means comprise an n-step rotation matrix, with n outputs and n inputs.

6. The system according to claim 4 wherein the shifting means comprise a buffer FiFo queue which receives data from a multiplexed group of signals associated with an incoming junction, and logic circuit means for controlling a write-read operation in the queue, so that when the queue is not empty a packet is supplied in synchronism with an external reference clock.

7. The system according to claim 2 wherein the second converting means comprise an n-step rotation matrix with n inputs and n outputs, said inputs being coupled to receive data from the buffer memory.

8. The system according to claim 2 wherein the bits of the packets are arranged in bytes.

9. The system according to claim 7 wherein each packet comprises n integer of n bytes, wherein the integer is at least one.

10. The system according to claim 1 wherein there are n additional input junctions, the first conversion means comprising a circuit for detecting the presence of information at the input junctions to select one of said junctions, and means for converting the packet received from the selected junction into n bytes which are delivered in parallel.

* * * * *